(12) United States Patent
Choi

(10) Patent No.: US 7,826,013 B2
(45) Date of Patent: Nov. 2, 2010

(54) LIQUID CRYSTAL DISPLAY DEVICE HAVING OCB MODE LIQUID CRYSTAL LAYER AND METHOD OF FABRICATING THE SAME

(75) Inventor: Kyung-Ho Choi, Ulsan-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 257 days.

(21) Appl. No.: 11/272,269

(22) Filed: Nov. 9, 2005

(65) Prior Publication Data
US 2006/0114378 A1 Jun. 1, 2006

(30) Foreign Application Priority Data
Nov. 26, 2004 (KR) .................. 10-2004-0098250

(51) Int. Cl.
*G02F 1/1333* (2006.01)
(52) U.S. Cl. ...................... 349/110; 349/129
(58) Field of Classification Search .............. 349/110, 349/129, 106, 65
See application file for complete search history.

(56) References Cited

U.S. PATENT DOCUMENTS

| | | | | |
|---|---|---|---|---|
| 5,358,810 | A * | 10/1994 | Yoshino ................. | 430/20 |
| 6,281,960 | B1 * | 8/2001 | Kishimoto et al. ........ | 349/156 |
| 6,424,396 | B1 * | 7/2002 | Kim et al. ................ | 349/130 |
| 6,654,075 | B1 * | 11/2003 | Takeichi et al. ........... | 349/43 |
| 6,753,551 | B2 * | 6/2004 | Cheng ..................... | 257/79 |
| 7,212,264 | B2 * | 5/2007 | Kim et al. ................ | 349/110 |
| 7,218,369 | B2 * | 5/2007 | Song et al. ............... | 349/129 |
| 7,453,536 | B2 * | 11/2008 | Choi ...................... | 349/110 |
| 7,505,103 | B2 * | 3/2009 | Takeda et al. ............. | 349/129 |
| 2001/0040656 | A1 * | 11/2001 | Na et al. .................. | 349/110 |
| 2003/0156237 | A1 * | 8/2003 | Lin et al. ................. | 349/110 |
| 2003/0174269 | A1 * | 9/2003 | Tanaka et al. ............. | 349/129 |

(Continued)

FOREIGN PATENT DOCUMENTS

JP 07-244213 9/1995

(Continued)

OTHER PUBLICATIONS

Patent Abstracts of Japan, Publication No. 2002-296596; Publication Date Oct. 9, 2002; in the name of Shioda, et al.

(Continued)

*Primary Examiner*—David Nelms
*Assistant Examiner*—Thanh-Nhan P Nguyen
(74) *Attorney, Agent, or Firm*—Christie, Parker & Hale, LLP

(57) ABSTRACT

A liquid crystal display device and a method of fabricating the same are provided. The liquid crystal display device includes: a lower substrate having an opening region and a non-opening region adjacent to the opening region; a pixel electrode located on the opening region; an upper substrate located above the lower substrate and having an opposite surface facing the lower substrate; a protrusion type light shielding layer pattern located on a portion of the opposite surface corresponding to the non-opening region; an opposite electrode located on the protrusion type light shielding layer pattern; and an OCB mode liquid crystal layer located between the pixel electrode and the opposite electrode.

19 Claims, 6 Drawing Sheets

U.S. PATENT DOCUMENTS

| | | | |
|---|---|---|---|
| 2004/0041963 A1* | 3/2004 | Ogishima et al. | 349/110 |
| 2004/0119923 A1* | 6/2004 | Lee et al. | 349/129 |
| 2004/0239856 A1* | 12/2004 | Miyachi | 349/129 |
| 2004/0252271 A1* | 12/2004 | Song | 349/155 |
| 2004/0263737 A1* | 12/2004 | Youn et al. | 349/129 |
| 2005/0162598 A1* | 7/2005 | Choi et al. | 349/139 |
| 2005/0259195 A1* | 11/2005 | Koganezawa | 349/65 |
| 2005/0270462 A1* | 12/2005 | Koma | 349/129 |
| 2006/0250556 A1* | 11/2006 | Kataoka et al. | 349/129 |

FOREIGN PATENT DOCUMENTS

| | | |
|---|---|---|
| JP | 09176645 A * | 7/1997 |
| JP | 2000-356775 | 12/2000 |
| JP | 2001-305547 | 10/2001 |
| JP | 2002-014317 | 1/2002 |
| JP | 2002-296596 | 10/2002 |
| JP | 2002-357829 | 12/2002 |
| JP | 2003-005185 | 1/2003 |
| JP | 2003-075873 | 3/2003 |
| JP | 2003-228085 | 8/2003 |
| KR | 2001-0060522 | 7/2001 |
| KR | 2001-0096153 | 11/2001 |
| KR | 2002-0097025 | 12/2002 |

OTHER PUBLICATIONS

Korean Patent Abstracts, Publication No. 1020010060522 A; Publication Date Jul. 7, 2001; in the name of Lee, et al.

Korean Patent Abstracts, Publication No. 1020020097025 A; Publication Date Dec. 31, 2002; in the name of Konno, et al.

Patent Abstracts of Japan, Publication No. 2003-228085, dated Aug. 15, 2003, in the name of Hirofumi Yamakita.

Japan Office action dated Sep. 30, 2008, for corresponding Japanese application 2005-195405, noting listed references in this IDS.

Patent Abstracts of Japan, Publication No. 2002-357829, dated Dec. 13, 2002, in the name of Tetsuya Kawamura.

Korean Patent Abstracts, Publication No. 1020010096153 A, dated Nov. 7, 2001, in the name of Gyeong Nam Lee.

* cited by examiner

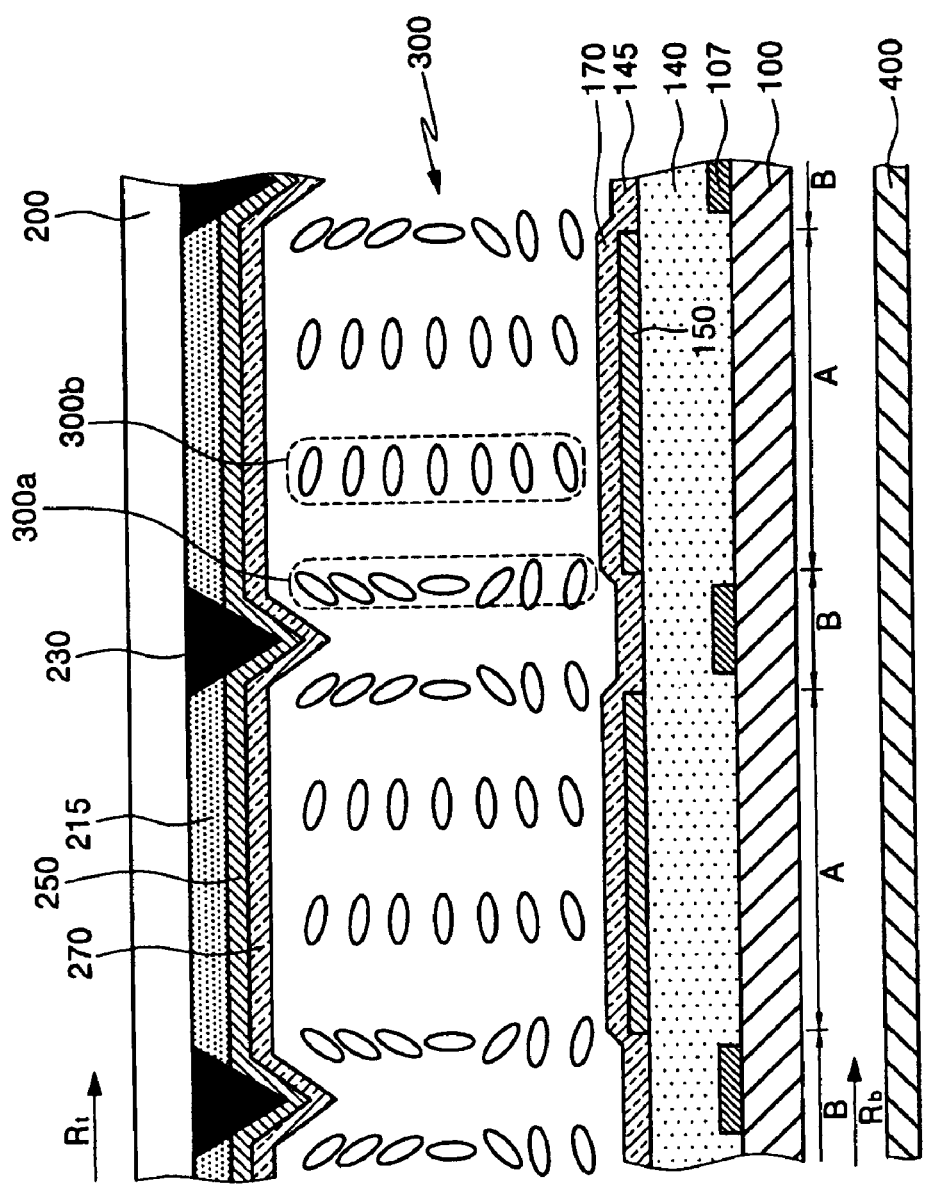

(a)  (b)  (c)  (d)

LIQUID CRYSTAL DISPLAY DEVICE HAVING OCB MODE LIQUID CRYSTAL LAYER AND METHOD OF FABRICATING THE SAME

CROSS-REFERENCE TO RELATED APPLICATION

This application claims priority to and the benefit of Korean Patent Application No. 10-2004-0098250, filed on Nov. 26, 2004, the entire content of which is incorporated herein by reference.

BACKGROUND OF THE INVENTION

1. Field of the Invention

The present invention relates to a liquid crystal display (LCD) device and, more particularly, to an LCD device having an optically compensated bend (OCB) mode liquid crystal layer.

2. Description of the Related Art

An LCD device has a liquid crystal injected between a pixel electrode and an opposite electrode, and changes alignment of the liquid crystal by forming an electric field between the pixel electrode and the opposite electrode. The changed alignment of the liquid crystal controls transmittance of light to form images.

Of the various types of LCD devices, an optically compensated bend (OCB) type LCD device has a fast response speed and an excellent viewing angle. The OCB type LCD device includes a pixel electrode, a lower alignment layer, an opposite electrode, an upper alignment layer, and a liquid crystal layer having a positive dielectric constant anisotropy $\Delta\epsilon$. The lower and upper alignment layers are rubbed (and/or coated) in the same direction, so that the liquid crystals have a splay alignment.

In order to form images in the OCB type LCD device, a high electric field should be formed between the pixel electrode and the opposite electrode. The high electric field changes a tilt angle of the liquid crystals located at a central portion of the liquid crystal layer to an angle of 90 so that the liquid crystals have a bend alignment. This is referred to as a bend transition. In addition, a predetermined voltage is applied between the pixel electrode and the opposite electrode to induce a change of a tilt angle of the rest of the liquid crystals other than the liquid crystals adjacent to the alignment layers and the liquid crystals located at the central portion. Thus, polarization of light which passes through the liquid crystal layer is changed to form images.

In order for the LCD device having a plurality of pixels to implement high resolution images, most of the liquid crystals arranged in the plurality of pixels should be bend-transited. However, this requires a lot of time, and pixels which are not bend-transited may still occur. In order to prevent this, a voltage is increased for the bend transition, leading to a high power consumption.

In order to resolve the above problem, an LCD device having protrusions is disclosed in a Korean Patent Publication (No. 2001-60522). The LCD device includes upper and lower substrates (or first and second substrates) which are facing each other. First and second electrodes are respectively formed on respective inside surfaces of the first and second substrates. Protrusions are disorderedly formed at corresponding locations on each of the first and second electrodes, and alignment layers are formed to cover the protrusions on the respective electrodes. A nematic liquid crystal layer having a positive dielectric constant anisotropy is injected between the alignment layers of the two substrates. Liquid crystal molecules of the liquid crystal layer are aligned to have a predetermined angle to a surface of the substrate along a tilt angle of the protrusions by an anchoring force of the alignment layer, so that they can have a stable bend alignment. As a result, an initial transition voltage can be lowered. However, a disclination line may be generated around the protrusions. Because of this, the protrusions, which are disorderly arranged, may cause a display quality degradation.

An LCD device having a structure of promoting a propagation of transition is disclosed in a Japanese Patent Publication (No. 2002-296596). The LCD device includes an array substrate and an opposite substrate with a liquid crystal layer interposed therebetween. The structure of promoting the propagation of transition is located on either of the array and opposite substrates. The structure of promoting the propagation of transition may be an electrode wire line for propagation or a protruding portion. However, controlling alignment of the liquid crystal using only the protruding portion may cause an insufficient bend transition.

An LCD with transition nucleus areas is disclosed in a Korean Patent Publication (No. 2002-97025). The LCD device includes first and second substrates, a plurality of pixel electrodes formed on the first substrate, and a common electrode formed on the second substrate. A first transition nucleus area with a plurality of continuous slant surfaces having a saw-tooth cross-sectional profile is formed on the first substrate layer. A second transition nucleus area with a plurality of continuous slant surfaces having a saw-tooth cross-sectional profile is formed on the second substrate. However, it may be difficult to continuously form the saw-tooth cross-sectional profile in a small area, and controlling alignment of the liquid crystal by only the transition nucleus area having the saw-tooth cross-sectional profile may cause an insufficient bend transition.

SUMMARY OF THE INVENTION

An embodiment of the present invention provides an LCD device which can induce a sufficient bend transition without degrading a display quality.

One embodiment of the present invention provides a liquid crystal display device including: a lower substrate having an opening region and a non-opening region adjacent to the opening region; a pixel electrode located on the opening region; an upper substrate located apart from the lower substrate and having an opposite surface facing the lower substrate; a protrusion type light shielding layer pattern located on a portion of the opposite surface corresponding to the non-opening region; an opposite electrode located on the protrusion type light shielding layer pattern; and an OCB mode liquid crystal layer located between the pixel electrode and the opposite electrode.

One embodiment of the present invention provides a method of fabricating a liquid crystal display device The method includes: forming a pixel electrode on an opening region of a lower substrate having the opening region and a non-opening region adjacent to the opening region; forming a protrusion type light shielding layer pattern on a portion of an upper substrate corresponding to the non-opening region; forming an opposite electrode on the protrusion type light shielding layer pattern; attaching the lower and upper substrates in a manner for the opposite electrode to face the lower substrate; and injecting a liquid crystal into a space between the lower and upper substrates to form an OCB mode liquid crystal layer.

BRIEF DESCRIPTION OF THE DRAWINGS

The accompanying drawings, together with the specification, illustrate exemplary embodiments of the present invention, and, together with the description, serve to explain the principles of the invention.

FIG. 5 is a cross-sectional view illustrating an LCD device according to another embodiment of the present invention;

DETAILED DESCRIPTION

Figure 1:
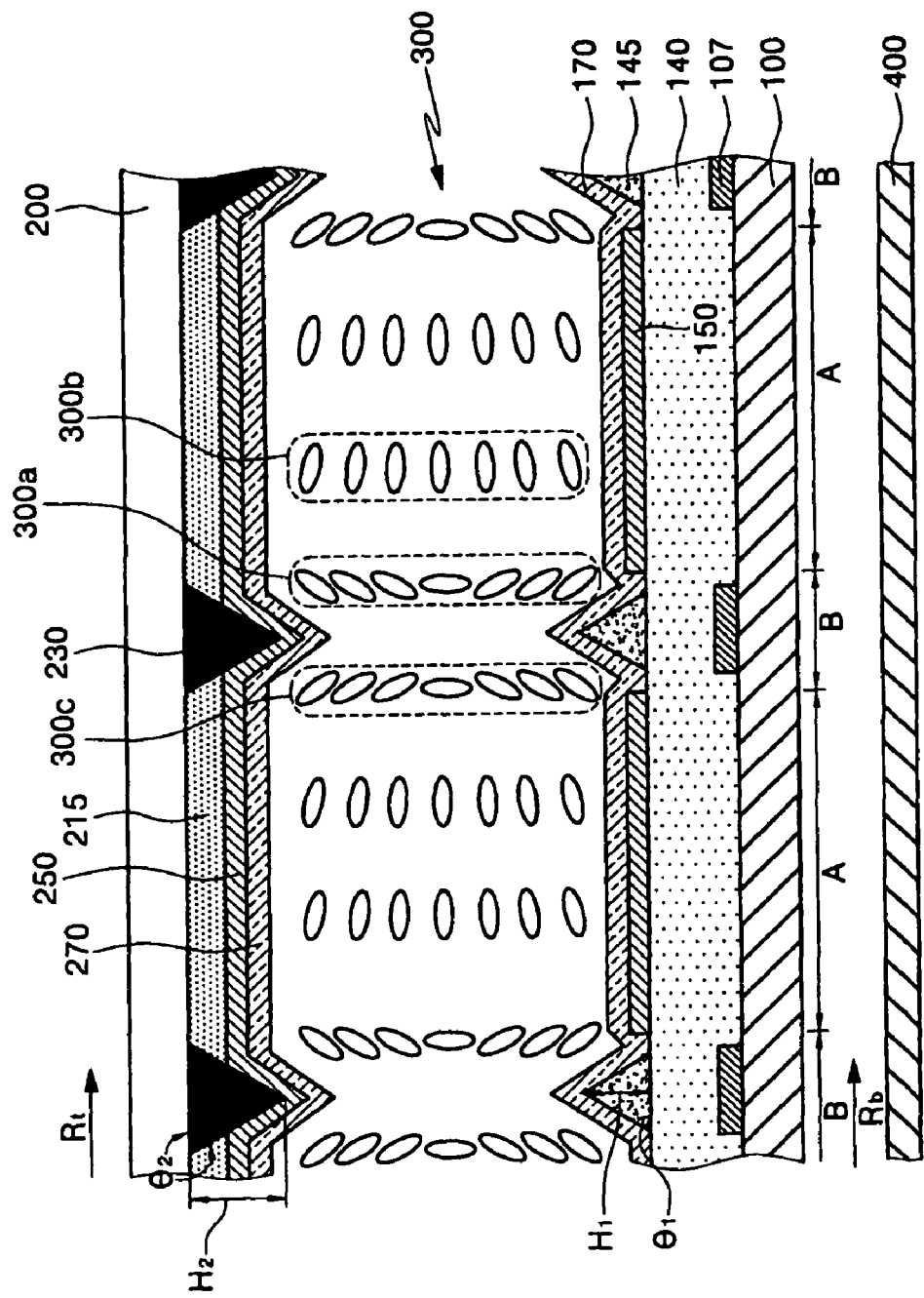
FIG. 1 is a cross-sectional view illustrating an LCD device according to an embodiment of the present invention.

In the following detailed description, exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive. There may be parts shown in the drawings, or parts not shown in the drawings, that are not discussed in the specification, as they are not essential to a complete understanding of the invention. Like reference numerals designate like elements. In a case where it is stated that one layer is formed "on" another layer, this may refer to the one layer being directly on the another layer or to a third layer being interposed between the one layer and the another layer.

FIG. 1 is a cross-sectional view illustrating an LCD device according to an embodiment of the present invention. FIG. 1 shows only a pixel region of the LCD device.

Referring to FIG. 1, a lower substrate 100 includes an opening region A and a non-opening region B which is adjacent to the opening region A. The opening region A is a region through which an image is displayed. On the non-opening region B, a signal line 107 and a thin film transistor (TFT, not shown) may be arranged. The signal line 107 may be a scan line or a data line. The TFT is switched by a control signal of the scan line to apply a voltage of the data line to a pixel electrode 150 which will be explained later.

An insulating layer 140 is arranged to cover the signal line 107 and the TFT.

The pixel electrode 150 is arranged on a portion of the insulating layer 140 corresponding to the opening region A. The opening region A may be defined by the pixel electrode 150. The pixel electrode 150 may be formed using indium tin oxide (ITO) or indium zinc oxide (IZO).

Figure 6:
FIG. 6 is a cross-sectional view illustrating various shapes of protrusions.

On a portion of the insulating layer 140 corresponding to the non-opening region B, a lower protrusion 145 may be arranged apart from the pixel electrode 150. The lower protrusion 145 may be arranged to overlap the signal line 107. In addition, the lower protrusion 145 may extend along the signal line 107. Meanwhile, at least one side of the lower protrusion 145 has a slope. In a case where both sides of the lower protrusion 145 have a slope, the slopes may be symmetric or asymmetric. For example, as shown in FIG. 6, the lower protrusion 145 may have a triangular cross section (a) having symmetric slopes, a triangular cross section (b) having asymmetric slopes, a half-circular cross section (c) having symmetric slopes, and/or a half-circular cross section (d) having asymmetric slopes. An angle of the slope, i.e., an angle $\theta_1$ formed by the slope and the lower substrate 100, is in a range from 10° to 80°. In a case where the angle $\theta_1$ is less than 10°, an efficiency resulting from the lower protrusion 145 may be reduced because the same effect can be obtained by an alignment treatment for a lower alignment layer 170 which will be explained later. In a case where the angle $\theta_1$ exceeds 80°, a bend-transition efficiency resulting from the angle $\theta_1$ may be reduced. In one embodiment, the angle $\theta_1$ is in a range from 10° to 60° so that a bend alignment can be more stabilized.

The lower alignment layer 170 is arranged to cover the lower protrusion 145 and the pixel electrode 150. The lower alignment layer 170 may be formed using an organic or inorganic layer. In one embodiment, the lower alignment layer 170 is formed using a polyimide-like organic layer. The lower alignment layer 170 may be parallel-aligned or tilt-aligned to have a predetermined tilt angle in which an alignment treatment is performed in a first direction Rb. The alignment treatment may be performed using a rubbing technique or a photo-alignment technique. Generally, a pretilt angle for the tilt alignment is less than 10°.

In a case where the lower protrusion 145 extends along the signal line 107, the alignment direction Rb of the lower alignment layer may be substantially perpendicular to an extending direction of the lower protrusion 145. Hence, a major axis direction of a liquid crystal adjacent to the lower alignment layer 170 can be placed along the slope with the angle $\theta_1$. As a result, a pretilt angle of a liquid crystal adjacent to the lower alignment layer 170 can be adjusted to be substantially the same as the tilt angle $\theta_1$ of the lower protrusion 145.

Alternatively, in one embodiment, the lower protrusion 145 may be omitted. An LCD device having no lower protrusion is shown in FIG. 5.

Referring back to FIG. 1, an upper substrate 200 having an opposite surface is arranged above the lower substrate 100. The opposite surface is opposing the lower substrate 100. A protrusion type light shielding layer pattern 230 may be arranged on a portion of the upper substrate 200 corresponding to the non-opening area B. The light shielding layer pattern 230 shields areas corresponding to areas where the TFT and the signal line 107 are located, and exposes an area corresponding to the opening area A. The light shielding layer pattern 230 plays a role as both a protrusion layer and a light shielding layer which will be explained later. Thus, since there is no need for separately forming the protrusion and the light shielding layer on the upper substrate 200, a manufacturing process is simplified.

In one embodiment, the light shielding layer pattern 230 and the lower protrusion 145 are located to at least partially correspond to each other. Like the lower protrusion 145, at least one side of the light shielding layer pattern 230 has a slope. In a case where both sides of the light shielding layer pattern 230 have a slope, the slopes may be symmetric or asymmetric. For example, as shown in FIG. 6, the light shielding layer pattern 230 may have a triangular cross section (a) having symmetric slopes, a triangular cross section (b) having asymmetric slopes, a half-circular cross section (c) having symmetric slopes, and/or a half-circular cross section (d) having asymmetric sloped. An angle of the slope, i.e., an angle $\theta_2$ formed by the slope and the upper substrate 200, is in a range from 10° to 80°. In a case where the angle $\theta_2$ is less than 10°, an efficiency resulting from the light shielding layer pattern 230 may be reduced because the same effect can be obtained by an alignment treatment for an upper alignment layer 270 which will be explained later. In a case where the angle $\theta_2$ exceeds 80°, a bend-transition efficiency resulting from the angle $\theta_2$ may be reduced. In one embodiment, the angle $\theta_2$ is in a range from 10° to 60° so that a bend alignment can be more stabilized.

On an area exposed by the light shielding layer pattern 230, a color filter 215 may be arranged. The color filter 215 may include red, green and blue color filters, each of which corresponds to each unit pixel.

An opposite electrode 250 is arranged to cover the light shielding layer pattern 230 and the upper color filter 215. In other words, the opposite electrode 250 is arranged on the opposite surface of the upper substrate 200 having the light shielding layer pattern 230. The opposite electrode 250 may be formed using indium tin oxide (ITO) or indium zinc oxide (IZO).

The upper alignment layer 270 may be arranged on the upper opposite electrode 250. The upper alignment layer 270 may be formed using an organic or inorganic layer. In one embodiment, the upper alignment layer 270 is formed using a polyimide-like organic layer. The upper alignment layer 270 may be parallel-aligned or tilt-aligned to have a predetermined tilt angle, in which an alignment treatment is performed in a second direction Rt that is substantially the same as the alignment direction Rb of the lower alignment layer 170.

Thus, in a case where the light shielding layer pattern 230 extends along the signal line 107, the alignment direction Rt may be substantially perpendicular to an extending direction of the light shielding layer pattern 230. Hence, a major axis direction of a liquid crystal adjacent to the upper alignment layer 270 can be placed along the slope with the angle $\theta_2$. As a result, a pretilt angle of a liquid crystal adjacent to the upper alignment layer 270 can be adjusted to be substantially the same as the tilt angle $\theta_2$ of the light shielding layer pattern 230.

An OCB mode liquid crystal layer 300 is arranged between the lower alignment layer 170 and the upper alignment layer 270, i.e., between the pixel electrode 150 and the opposite electrode 250. The OCB mode liquid crystal layer 300 may include nematic liquid crystals having a dielectric constant anisotropy that is positive. In one embodiment, the liquid crystals of the liquid crystal layer 300 are classified into liquid crystals 300b which are located apart from the protrusions 145 and 230 and liquid crystals 300a and 300c which are located adjacent to the protrusions 145 and 230.

Among the liquid crystals 300b which are located apart from the protrusions 145 and 230, the lower and upper liquid crystals which are respectively adjacent to the lower and upper alignment layers 170 and 270 are parallel-aligned or tilt-aligned with a pretilt angle of less than 10° in the alignment directions Rb and Rt due to the anchoring force of the alignment layer 170 and 270. However, among the liquid crystals 300a and 300c which are located adjacent to the protrusions 145 and 230, the lower liquid crystals which are adjacent to the lower alignment layer 170 are arranged with a pretilt angle close to the tilt angle $\theta_1$ of the lower protrusion 145 due to the anchoring force of the lower alignment layer 170 which covers the lower protrusion 145, and the upper liquid crystals which are adjacent to the upper alignment layer 270 are arranged with a pretilt angle close to the tilt angle $\theta_2$ of the light shielding layer pattern 230 due to the anchoring force of the upper alignment layer 270 which covers the light shielding layer pattern 230.

Figure 7:
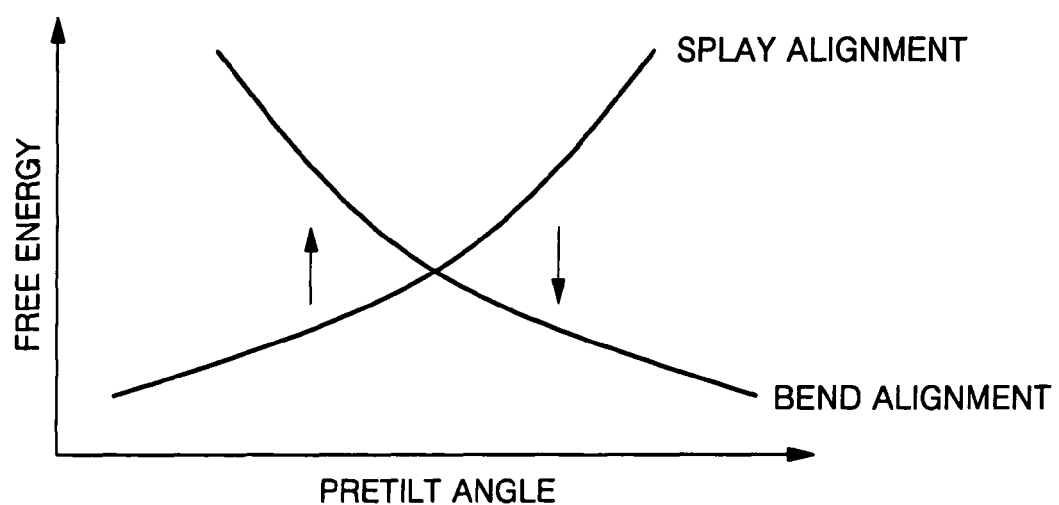
FIG. 7 shows free energies of a splay alignment and a bend alignment according to variations of pretilt angles.

FIG. 7 shows free energies of a splay alignment and a bend alignment according to variations of pretilt angles. Referring to FIG. 7, as the pretilt angle is increased, the free energy of the bend alignment will eventually stabilize to become lower than that of the splay alignment. Because of this, the liquid crystals 300b which are located apart from the protrusions 145 and 230 have the splay alignment, and most of the liquid crystals 300a and 300c which are located adjacent to the protrusions 145 and 230 have an alignment that is close to the bend alignment. Further, a case where the protrusions 145 and 230 are formed at locations corresponding to each other has a closer alignment to the bend alignment than a case where the lower protrusion 145 is not formed. However, some of the liquid crystals 300a and 300c which are arranged adjacent to the protrusions 145 and 230 may remain closer to the splay alignment.

Meanwhile, the liquid crystals 300a and 300c which are located on left and right sides of the protrusions 145 and 230 differ in direction of the pretilt angle, and thus, there may occur a disclination line therebetween. However, due to light shielding characteristic of the protrusion type light shielding layer pattern 230, a degradation of screen quality due to the disclination line can be substantially reduced or prevented.

The liquid crystal display device may further include a back light device 400 which provides white light to a bottom portion of the lower substrate 100. This liquid crystal display device can implement a color image using the color filter layer 215.

Alternatively, the back light device 400 may include red (R), green (G) and blue (B) back lights that may be arranged below the lower substrate 100. In this case, the color filter layer 215 is omitted. Such a liquid crystal display device is referred to as a field sequential liquid crystal display (FS-LCD) device. The FS-LCD device time-divisionally and/or sequentially displays red, green or blue lights through a liquid crystal located in one unit pixel and displays a color image using an afterimage effect. This liquid crystal display device has a rapid response speed and thus is suitable for implementing a moving picture.

Figure 2:
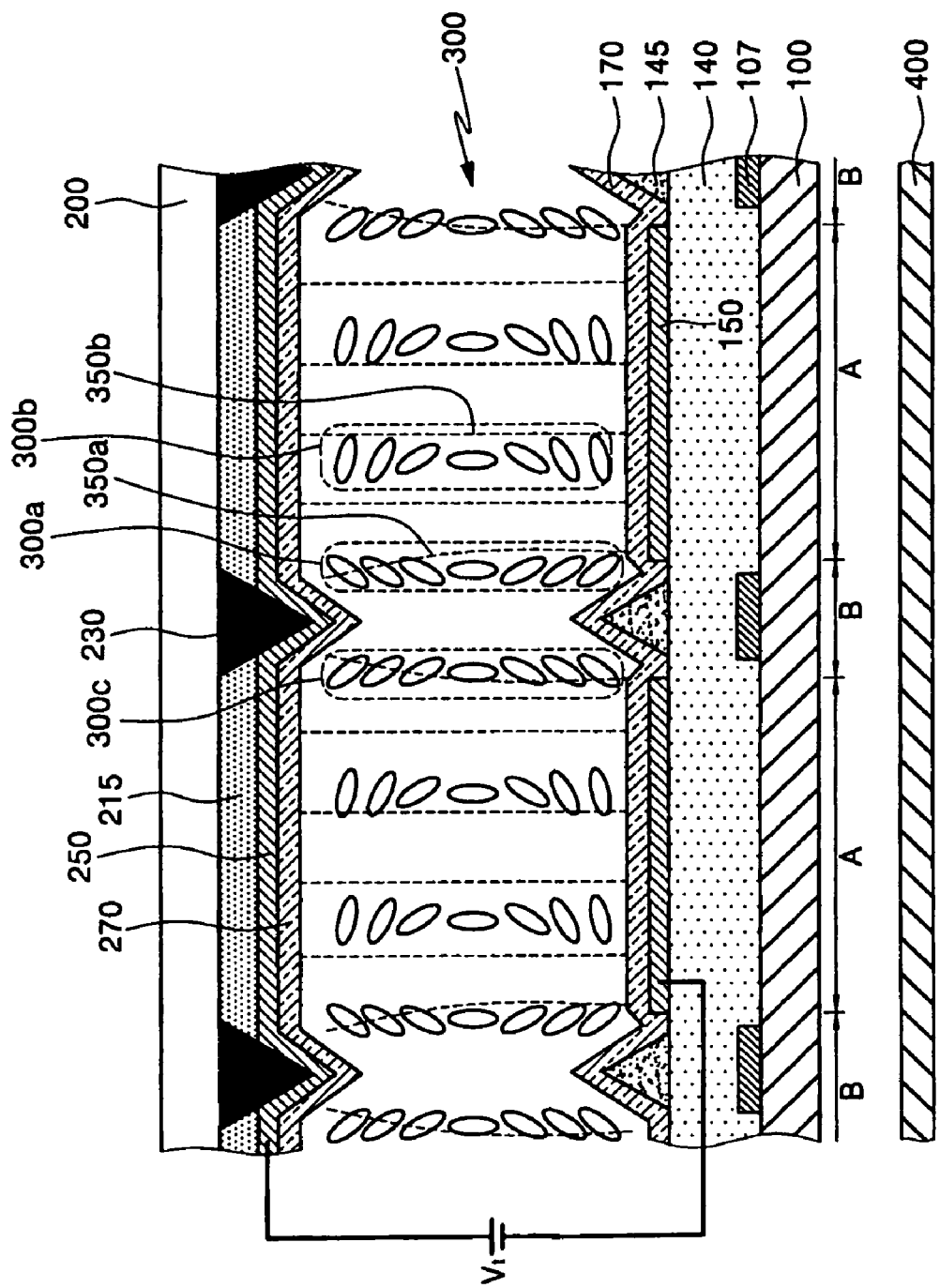
FIG. 2 is a cross-sectional view illustrating a bend transition of the LCD device of FIG. 1.

FIG. 2 is a cross-sectional view illustrating a bend transition of the LCD device of FIG. 1.

Referring to FIG. 2, a voltage is applied to the pixel electrode 150 and another voltage is applied to the opposite electrode 250, so that the pixel electrode 150 and the opposite electrode 250 have a predetermined voltage difference Vt therebetween. As a result, electric fields 350a and 350b are formed between the pixel electrode 150 and the opposite electrode 250. That is, the electric field 350b in the form of a straight line is formed in a vertical direction in a region where a plane portion of the opposite electrode 250 and another plane portion of the pixel electrode 150 face each other. However, the electric field 350a in the form of a bent line is formed in a vertical direction in a region where a protruding portion of the opposite electrode 250 by the protrusion type light shielding layer pattern 230 and an edge of the pixel electrode 150 face each other. Since the protruding portion of the opposite electrode 250 by the protrusion type light shielding layer pattern 230 is relatively closer in distance to the pixel electrode 150 than other portions (e.g., the plane portions), a relatively strong electric field is formed. Due to the distorted and strong electric field, among the liquid crystals adjacent to the protrusion type light shielding layer pattern 230, the liquid crystals, which remain splay-aligned or are not sufficiently transited to the bend alignment, can now be more rapidly transited to the bend alignment. In short, since the opposite electrode 250 is arranged on the protrusion type light shielding layer pattern 230, the electric field can be distorted and can become stronger, so that the liquid crystals adjacent to the protrusion type light shielding layer pattern 230 can be sufficiently transited to the bend alignment in a short time.

The bend transition is propagated to the other region from the liquid crystals already transited into the bend alignment, i.e., the transition kernel. Thus, the liquid crystals located in the whole liquid crystal layer 300 are transited to the bend alignment. As a result, due to the liquid crystals now being more rapidly transited to the bend alignment, a time that the bend transition is propagated to the whole liquid crystal layer 300, i.e., a transition time, can be reduced, and also a transition voltage, too, can be reduced.

Thereafter, a voltage difference between the pixel electrode 150 and the opposite electrode 250 remains higher than a critical voltage Vcr to maintain the bend alignment. If the voltage difference is increased, a tilt angle of the rest of the liquid crystals, other than the liquid crystals which are adjacent to the alignment layers 170 and 270 and the liquid crystals which are located in central portion, is increased, and if the voltage difference is reduced, the tilt angle is decreased. Thus, polarized light which passes through the liquid crystal layer 300 is modified, thereby forming an image. The variation of the tilt angle of those liquid crystals is of such a fast speed that a rapid response time can be achieved. The liquid crystal display device described above is an OCB mode LCD device, and, in one embodiment, the OCB mode LCD device is driven by a field sequential driving method to achieve an even faster response speed.

FIGS. 3A, 3B, 4A and 4B are cross-sectional views illustrating a method of fabricating an LCD device according to an embodiment of the present invention, which show only a pixel region of the LCD device.

Figure 3A:
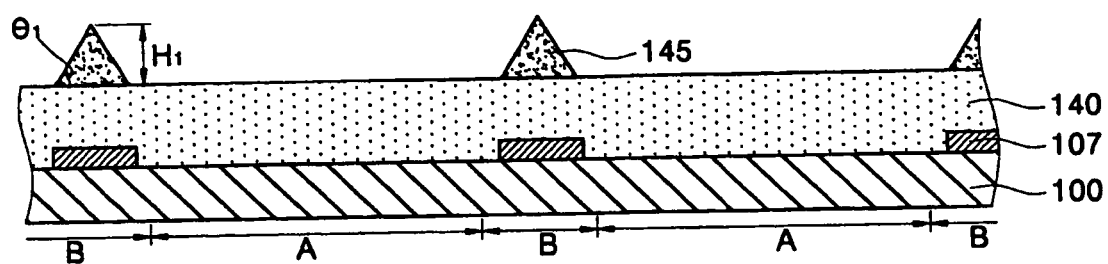
FIGS. 3A, 3B, 4A and 4B are cross-sectional views illustrating a method of fabricating an LCD device according to an embodiment of the present invention, which show only a pixel region of the LCD device.

Referring to FIG. 3A, a conductive material layer is deposited on a lower substrate 100 having an opening region A and a non-opening region B which is adjacent to the opening region A. The conductive material layer is patterned to form a signal line 107 on the non-opening region B. The signal line 107 may be a scan line or a data line. An insulating layer 140 is formed above the whole surface of the lower substrate 100 while covering the signal line 107.

A lower protrusion 145 is formed on a portion of the insulating layer 140 corresponding to the non-opening region B. The lower protrusion 145 may be formed using an organic or inorganic layer. The organic layer may be formed using an acrylic-based polymer layer or a benzocyclobutene (BCB) layer, and the inorganic layer may be formed using a silicon oxide layer or a silicon nitride layer. At least one side of the lower protrusion 145 has a slope. A tilt angle of the slope, i.e., an angle $\theta_1$ formed by the slope and the lower substrate, is in a range between 10° and 80°. In one embodiment, the tilt angle $\theta_1$ of the slope is in a range between 10° and 60°.

The protrusion 145 in which at least one side has a slope may be formed using a press technique, an oblique evaporation technique, a photolithography technique, and/or a laser beam machining technique. In more detail, the protrusion 145 may be formed using the press technique such that an organic layer is deposited on the insulating layer 140, then a mold having grooves is placed on the organic layer, next heat and pressure are applied to the mold and then cooled, and finally the mold is separated from the substrate 100. The protrusion 145 may be formed using the oblique evaporation technique by depositing a protrusion material at a predetermined tilt angle against the substrate 100. The protrusion 145 may be formed using the photolithography technique such that a protrusion material is deposited on the substrate 100, next the photoresist is formed on the protrusion material, next the photoresist is exposed to light using a photo mask having a pattern which continuously changes light transmittance to thereby form a photoresist pattern, and finally the protrusion material is etched using the photoresist pattern as a mask. The protrusion 145 may be formed using the laser beam machining technique such that a protrusion material is deposited on the substrate 100, and then a laser beam is irradiated to the protrusion material at a predetermined tilt angle.

Figure 3B:
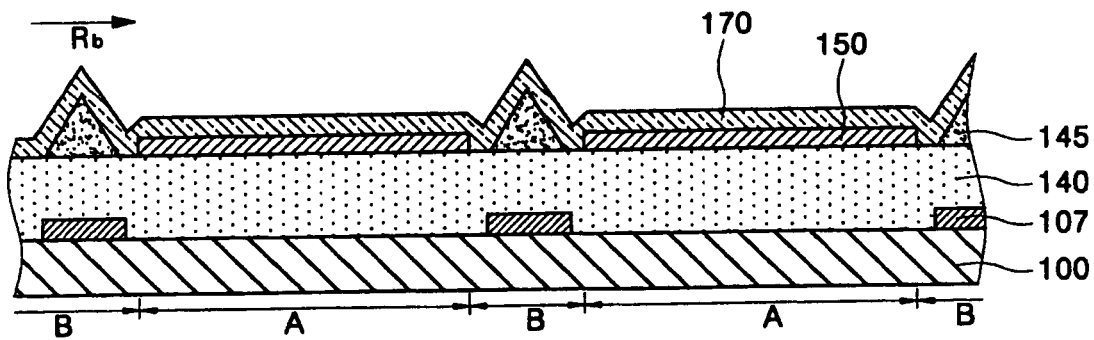

Referring to FIG. 3B, a pixel conductive material layer is deposited on the substrate 100 having the lower protrusion 145 and then patterned to form a pixel electrode 150 above the opening region A which is apart from the lower protrusion 145. The pixel conductive material layer may be formed using ITO or IZO. Alternatively, the lower protrusion 145 may be formed after the pixel electrode 150 is formed.

A lower alignment layer 170 is formed on the whole surface of the lower substrate 100 including the pixel electrode 150. The lower alignment layer 170 may be formed using an organic or inorganic layer. In one embodiment, the lower alignment layer 170 is formed using a polyimide-based organic layer. Subsequently, the lower alignment layer 170 is parallel-aligned or tilt-aligned in a first direction Rb. The alignment treatment may be performed using a rubbing technique or a photo-alignment technique.

Figure 4A:
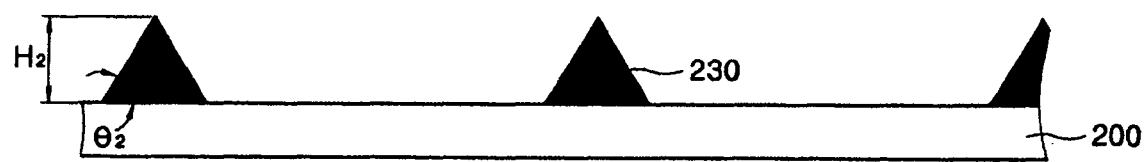

Referring to FIG. 4A, an upper substrate 200 is prepared. A protrusion type light shielding layer pattern 230 is formed on the upper substrate 200. The light shielding layer pattern 230 is formed on a region corresponding to a non-opening region (e.g., the non-opening region B in FIG. 3B) of a lower substrate (e.g., the lower substrate 100 in FIG. 3B) to expose another region corresponding to an opening region (e.g., the opening region A in FIG. 3B) of the lower substrate.

The protrusion type light shielding layer pattern 230 may be formed using an organic or inorganic layer. The organic layer may be a carbon black layer, and the inorganic layer may be formed using a metal layer such as a chromium (Cr) layer, a tantalum (Ta) layer, or a molybdenum (Mo) layer; a metal oxide layer such as CrOx, TaOx, or MoOx; or a multiple layer having a metal layer and a metal oxide layer. At least one side of the protrusion type light shielding layer pattern 230 has a slope. A tilt angle of the slope, i.e., an angle $\theta_2$ formed by the slope and the upper substrate 200, is in a range between 10° and 80°. In one embodiment, the tilt angle $\theta_2$ of the slope is in a range between 10° and 60°. A method of forming the light shielding layer 230 having at least one slope may be substantially the same as the method of forming the lower protrusion 145.

Figure 4B:
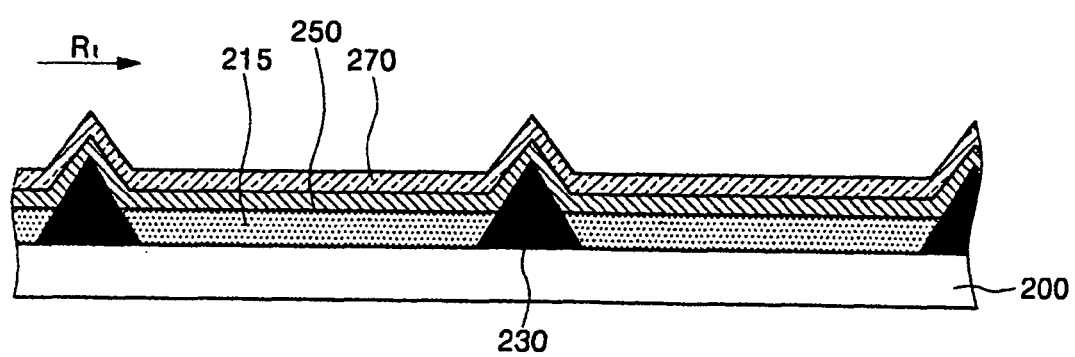

Referring to FIG. 4B, a color filter layer 215 is formed on an exposed portion by the light shielding layer pattern 230.

An opposite electrode 250 is formed to cover the color filter layer 215 and the light shielding layer pattern 230. An upper alignment layer 270 is formed on the opposite electrode 250, and the upper alignment layer 270 is aligned in a second direction Rt that is substantially the same as the lower alignment layer 170. A material and alignment method of the upper alignment layer 270 may be substantially the same as those of the lower alignment layer 170.

Finally, the lower substrate 100 and the upper substrate 200 are attached to each other to have a predetermined gap therebetween, and a liquid crystal is injected into a space between the lower and upper substrates 100 and 200 for forming an OCB mode liquid crystal layer 300, thereby completing the LCD device of FIG. 1.

In view of the foregoing, an OCB mode LCD device of the present invention can induce a bend transition in a short time and also can include a protrusion type light shielding layer pattern which plays a role as both a protrusion layer and a light shielding layer, thereby simplifying a manufacturing process.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A liquid crystal display device comprising:
   a lower substrate having an opening region and a non-opening region adjacent to the opening region;
   a pixel electrode located on the opening region;
   an upper substrate located apart from the lower substrate and having an opposite surface facing the lower substrate;
   a plurality of protrusion type light shielding layer patterns located on a portion of the opposite surface corresponding to the non-opening region;
   an opposite electrode over the upper substrate, being located on the protrusion type light shielding layer patterns to continuously cover at least two of the protrusion type light shielding layer patterns; and
   an optically compensated bend (OCB) mode liquid crystal layer located between the pixel electrode and the opposite electrode,
   wherein each of the protrusion type light shielding layer patterns has two substantially symmetrical sides each having a slope that is configured to control the alignment of liquid crystal molecules of the OCB mode liquid crystal layer.

2. The device of claim 1, wherein an angle formed by the slope and the upper substrate is between 10° and 80°.

3. The device of claim 2, wherein the angle formed by the slope and the upper substrate is between 10° and 60°.

4. The device of claim 1, further comprising a plurality of lower protrusions located on the non-opening region of the lower substrate.

5. The device of claim 4, wherein the protrusion type light shielding layer patterns and the lower protrusions are located to at least partially correspond to each other.

6. The device of claim 5, wherein the protrusion type light shielding layer patterns and the lower protrusions are substantially symmetrical with respect to an axis traversing both the protrusion type light shielding layer patterns and the lower protrusions.

7. The device of claim 1, further comprising a lower alignment layer located on the pixel electrode and an upper alignment layer located on the opposite electrode, wherein the lower and upper alignment layers have substantially the same alignment direction.

8. The device of claim 1, further comprising a color filter located on a portion of the opposite surface corresponding to the opening region.

9. The device of claim 1, further comprising a backlight for providing red (R), green (G), and blue (B) lights, wherein the lower substrate is between the backlight and the upper substrate.

10. The device of claim 1, wherein the OCB mode liquid crystal layer includes a nematic liquid crystal having a positive dielectric constant anisotropy.

11. A liquid crystal display device comprising:
    a lower substrate having an opening region and a non-opening region adjacent to the opening region;
    a pixel electrode located on the opening region;
    an upper substrate located apart from the lower substrate and having an opposite surface facing the lower substrate;
    a plurality of protrusion type light shielding layer patterns located on a portion of the opposite surface corresponding to the non-opening region;
    an opposite electrode over the upper substrate, being located on the protrusion type light shielding layer patterns to continuously cover at least two of the protrusion type light shielding layer patterns;
    an optically compensated bend (OCB) mode liquid crystal layer located between the pixel electrode and the opposite electrode; and
    a plurality of lower protrusions located on the non-opening region of the lower substrate,
    wherein at least one side of each of the lower protrusions has a slope, and
    wherein each of the protrusion type light shielding layer patterns has two substantially symmetrical sides each having a slope that is configured to control the alignment of liquid crystal molecules of the OCB mode liquid crystal layer.

12. The device of claim 11, wherein an angle formed by the slope and the lower substrate is between 10° and 80°.

13. The device of claim 12, wherein the angle foamed by the slope and the lower substrate is between 10° and 60°.

14. The device of claim 12, wherein the protrusion type light shielding layer patterns and the lower protrusions are substantially symmetrical with respect to an axis traversing both the protrusion type light shielding layer patterns and the lower protrusions.

15. A method of fabricating a liquid crystal display device, the method comprising:
    forming a pixel electrode on an opening region of a lower substrate having the opening region and a non-opening region adjacent to the opening region;
    foaming a plurality of protrusion type light shielding layer patterns on a portion of an upper substrate corresponding to the non-opening region;
    forming an opposite electrode on the protrusion type light shielding layer patterns to continuously cover at least two of the protrusion type light shielding layer patterns and over the upper substrate;
    attaching the lower and upper substrates in a manner for the opposite electrode to face the lower substrate;
    injecting a liquid crystal into a space between the lower and upper substrates to form an optically compensated bend (OCB) mode liquid crystal layer; and
    forming a plurality of lower protrusions on the non-opening region before or after the forming of the pixel electrode,
    wherein at least one side of each of the lower protrusions has a slope, and
    wherein each of the protrusion type light shielding layer patterns has two substantially symmetrical sides each having a slope that is configured to control the alignment of liquid crystal molecules of the OCB mode liquid crystal.

16. The method of claim 15, wherein the lower protrusions are formed using a technique selected from the group consisting of a press technique, an oblique evaporation technique, a photolithography technique, a laser beam machining technique, and combinations thereof.

17. The method of claim 15, wherein the protrusion type light shielding layer patterns and the lower protrusions are formed to be substantially symmetrical with respect to an axis traversing both the protrusion type light shielding layer patterns and the lower protrusions.

18. A liquid crystal display device comprising:
    a pixel electrode located on an opening region;

an upper substrate located apart from a lower substrate and having an opposite surface facing the lower substrate;

a plurality of protrusion type light shielding layer patterns located on a portion of the opposite surface corresponding to a non-opening region;

an opposite electrode located on the protrusion type light shielding layer patterns to continuously cover at least two of the protrusion type light shielding layer patterns and over the upper substrate; and an optically compensated bend (OCB) mode liquid crystal layer located between the pixel electrode and the opposite electrode, wherein each of the protrusion type light shielding layer patterns has two substantially symmetrical sides each having a curvature that is configured to control the alignment of liquid crystal molecules of the OCB mode liquid crystal layer.

19. A method of fabricating a liquid crystal display device, the method comprising:

forming a pixel electrode on an opening region of a lower substrate having the opening region and a non-opening region adjacent to the opening region;

forming a plurality of protrusion type light shielding layer patterns on a portion of an upper substrate corresponding to the non-opening region;

forming an opposite electrode on the protrusion type light shielding layer patterns to continuously cover at least two of the protrusion type light shielding layer patterns and over the upper substrate;

attaching the lower and upper substrates in a manner for the opposite electrode to face the lower substrate; and injecting a liquid crystal into a space between the lower and upper substrates to form an optically compensated bend (OCB) mode liquid crystal layer, wherein each of the protrusion type light shielding layer patterns has two substantially symmetrical sides each having a curvature that is configured to control the alignment of liquid crystal molecules of the OCB mode liquid crystal layer.

* * * * *

UNITED STATES PATENT AND TRADEMARK OFFICE
CERTIFICATE OF CORRECTION

PATENT NO. : 7,826,013 B2  Page 1 of 1
APPLICATION NO. : 11/272269
DATED : November 2, 2010
INVENTOR(S) : Kyung-Ho Choi It is certified that error appears in the above-identified patent and that said Letters Patent is hereby corrected as shown below:

In the Claims

Column 10, Claim 13, line 22     Delete "foamed"
                                 Insert -- formed --

Column 10, Claim 15, line 34     Delete "foaming"
                                 Insert -- forming --

Signed and Sealed this
Twenty-fourth Day of January, 2012

David J. Kappos
*Director of the United States Patent and Trademark Office*